United States Patent [19]
Moretti

[11] Patent Number: 4,905,942
[45] Date of Patent: Mar. 6, 1990

[54] MOUNTING UNIT FOR ATTACHING SUPPLY LINES OR CABLES TO MOTOR VEHICLES

[75] Inventor: Erminio Moretti, Grenoble, France
[73] Assignee: A. Raymond, Lorrach, Fed. Rep. of Germany
[21] Appl. No.: 270,325
[22] Filed: Nov. 14, 1988
[30] Foreign Application Priority Data

Nov. 14, 1987 [DE] Fed. Rep. of Germany ....... 3738720

[51] Int. Cl.$^4$ ............................................. F16L 3/22
[52] U.S. Cl. ..................................... 248/68.1; 248/73
[58] Field of Search ...................... 248/58, 59, 62, 65, 248/67.5, 67.7, 68.1, 73, 74.1, 74.2, 220.2, 221.3, 221.4, 224.4, 309.1, 316.1, 500, 507, 508; 24/578, 575, 487

[56] References Cited

U.S. PATENT DOCUMENTS

| | | | |
|---|---|---|---|
| 3,188,030 | 6/1965 | Fischer | 248/68.1 |
| 4,099,626 | 7/1978 | Magnussen | 248/68.1 |
| 4,114,241 | 9/1978 | Bisping | 248/68.1 |
| 4,306,697 | 12/1981 | Mathews | 248/68.1 |
| 4,326,689 | 4/1982 | Edel | 248/221.4 |
| 4,358,080 | 11/1982 | Walker | 248/68.1 |
| 4,450,605 | 5/1984 | Schaty | 24/545 |
| 4,467,988 | 8/1984 | Kraus | 248/68.1 |
| 4,493,468 | 1/1985 | Roach | 248/68.1 |
| 4,550,891 | 11/1985 | Schaty | 248/74.2 |
| 4,655,424 | 4/1987 | Oshida | 248/68.1 |

FOREIGN PATENT DOCUMENTS

| | | | |
|---|---|---|---|
| 88203 | 9/1983 | European Pat. Off. | 248/68.1 |
| 935679 | 11/1955 | Fed. Rep. of Germany | 248/68.1 |
| 3236981 | 4/1984 | Fed. Rep. of Germany | 248/68.1 |
| 749510 | 5/1956 | United Kingdom | 248/68.1 |
| 2166794 | 5/1986 | United Kingdom | 248/62 |

Primary Examiner—Ramon O. Ramirez
Assistant Examiner—Robert A. Olson
Attorney, Agent, or Firm—Finnegan, Henderson, Farabow, Garrett & Dunner

[57] ABSTRACT

A mounting unit for attaching supply lines or cables to a motor vehicle by means of socket bolts, and in particular to threaded bolts located on the underside of the vehicle's chassis, and cable holders for use in forming the mounting units, the cable holders have a fixing part of securing the holders to the bolts, arms for holding the cables in the holder and elastically latchable and unlatchable connecting hooks and apertures for connecting the holders together. This permits the units to be stacked one on top of the other by connecting their holders together to keep the holders accurately positioned along the length of lines or cables during transport and prior to assembly of the units to the vehicle.

7 Claims, 2 Drawing Sheets

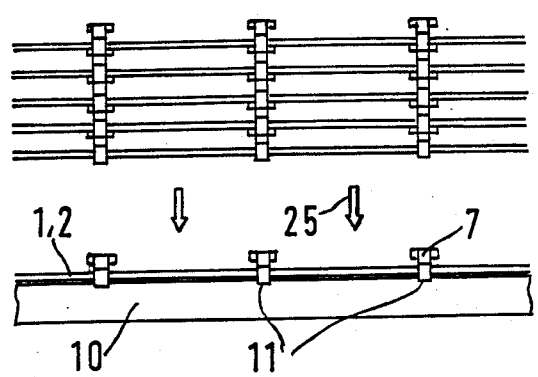
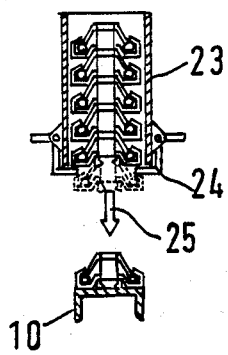
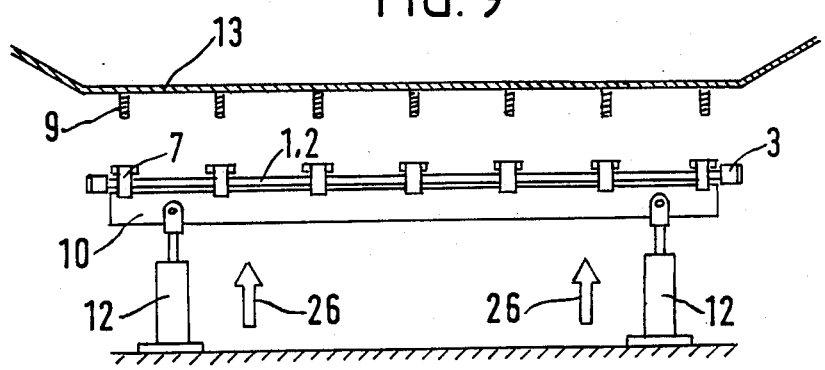
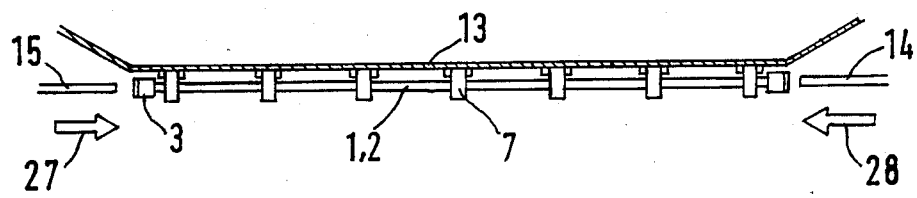
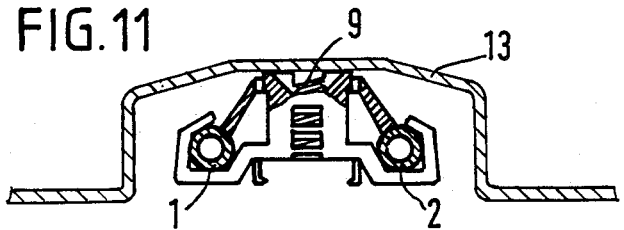

MOUNTING UNIT FOR ATTACHING SUPPLY LINES OR CABLES TO MOTOR VEHICLES

BACKGROUND OF THE INVENTION

This invention relates to a mounting unit for attaching supply lines or cables to motor vehicles by means of socket bolts, and in particular to threaded bolts, fastened to the underside of the vehicle's chassis. In addition, the invention relates to cable holders for use in the mounting unit having a part for securing the cable holders to the socket bolts and a part for holding the cables, wherein the cables of the mounting unit, which are cut to the proper length and are aligned for placement under the chassis, are connected to the cable holders at accurately defined locations.

An example of such a mounting unit is shown in West German Patent Application P No. 37 05 626. A prerequisite for trouble-free mounting of such a unit is that the cable holders be precisely aligned with respect to the corresponding distances between the threaded bolts. One way is to align the cable holders of the unit on a mounting plate by pushing them into depressions in the mounting plate that correspond to the positions of the threaded bolts on the vehicle.

If it is desirable at the automobile manufacturing plant to avoid this procedure of having to first mount the cable holders on a mounting plate, the holders then must be locked in position on the supply lines or cables at the supplier's plant in accurately defined positions corresponding to the locations of the threaded bolts so that they cannot be shifted in the longitudinal direction. Furthermore, care must be taken during transport and until the units are placed on the vehicle that the cable holders retain their positions relative to the cables. With the present state of the art, various options are available for doing this, consisting either in the use of additional positioning devices—such as spring clips or rubber parts—or by having bulges on the supply lines or cables that are integrally molded thereon to prevent any shifting of the holders in the axial direction.

An object of the present invention therefore is to provide a mounting unit for supply lines or cables in which the cable holders are accurately aligned with respect to the cables in an efficient and simple manner and which units can be transported and subsequently mounted to a vehicle's chassis in a better as received condition.

SUMMARY OF THE INVENTION

This object is achieved in accordance with the present invention by providing in a mounting unit for attaching a supply line or cable to a plurality of spaced bolts, said unit comprising at least one cable and a plurality of cable holders corresponding to the number of bolts mounted on the cable, with each holder having a fixing part for anchoring it to a bolt, an arm for receiving the cable and means for locking the cable in the arm, the improvement comprising cooperating connecting means on the cable holders that can be elastically latched and unlatched so that a plurality of mounting units can be stacked one on top of the other by connecting their cable holders together to thereby keep the holders fixed relative to each other in accurately defined postions along the length of the cable.

The invention also provides in a cable holder for securing a cable to a plurality of spaced bolts in which the cable is held by a plurality of the holders to form a mounting unit, the improvement comprising cooperating connecting means on the holders that can be elastically latched and unlatched so that a plurality of mounting units can be stacked one on top of the other by connecting their holders together to keep the holders accurately positioned along the length of the cable prior to their being secured to the bolts.

BRIEF DESCRIPTION OF THE DRAWINGS

Further objects and advantages of the invention will appear from the following description of an embodiment of the invention as shown in the accompanying drawings, in which:

FIG. 7 is a side view of the same package as the bottommost mounting unit is being withdrawn for transfer to a mounting plate;

FIG. 8 is a cross sectional view of FIG. 7;

FIG. 9 shows the mounting unit as it is being mounted to the bottom of a vehicle;

FIG. 10 shows the mounting unit secured to the vehicle, and

FIG. 11 is a cross-sectional view of the attached mounting unit of FIG. 10 on a larger scale.

DETAILED DESCRIPTION OF THE INVENTION

Figure 1:
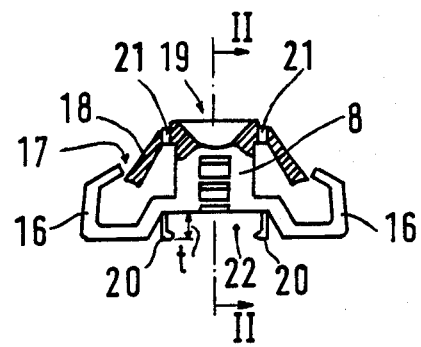
FIG. 1 is a side view of a cable holder of the invention, partially in section.

The mounting unit shown in FIGS. 9 and 10 consists essentially of two supply lines or cables 1 and 2, preferably made of plastic material and having identical or different diameters and a plurality of cable holders 7. The lines 1 and 2 are connected at their ends to so-called plug-in couplings 3 designed to receive connecting lines 14 and 15 for further transmission. It will be understood that the plug-in couplings 3 may also be connected to the ends of the connecting lines 14 and 15, so that the supply lines 1 and 2 can be assembled together in the same manner with the connecting lines.

The supply lines 1 and 2 are interconnected by the plurality of cable holders 7, which are provided with an integral fixing part 8 for anchoring the cable holders 7 onto so-called socket bolts 9. These may be either T-bolts or threaded bolts, with the drawings showing the preferred threaded bolts. See FIGS. 9-11.

Figure 5:
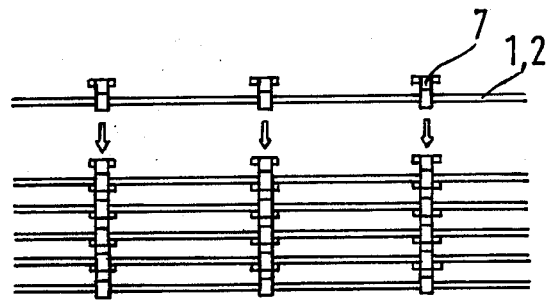
FIG. 5 is a side view of a plurality of mounting units joined together as a package.
Figure 6:
FIG. 6 is a cross-sectional view of the package of FIG. 5.

As will be explained in more detail below, cable holders 7 are constructed so as to be stackable one on top of the other and interconnectable so that several mounting units can be joined together to form one package. To interconnect them, the cable holders 7 are equipped with elastically latchable and unlatchable connecting means. As embodied the connecting means comprises depending hooks 20 on the bottom side of the holders 7 and cooperating apertures 21 on their top side. This makes it possible to connect the units together by connecting their cable holders together so that a plurality of units can be transported as a single package. See FIGS. 5 and 6.

Figure 2:
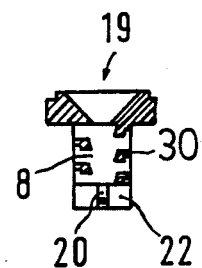
FIG. 2 is a cross-sectional view of the bolt-anchoring hole of the holder taken along the line II—II in FIG. 1.
Figure 3:
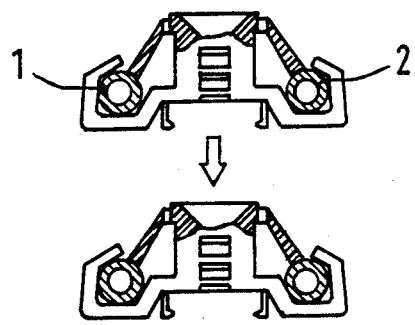
FIG. 3 shows two cable holders, arranged one on top of the other and in the process of being joined together.
Figure 4:
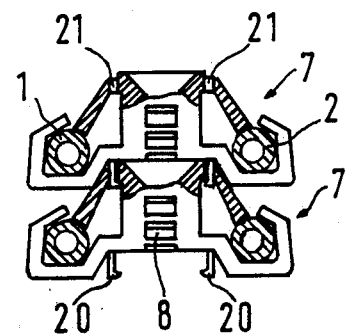
FIG. 4 shows two cable holders after they have been joined together.

As shown in FIGS. 1 and 2, the cable holders consist of the above-mentioned fixing part 8 and also holding arms 16 integrally molded on either side thereof, having openings 17 for receiving the lines 1,2. Means are provided for locking the lines in arms 16. As embodied, this means comprises locking arms 18 integrally molded with the fixing part 8 that point toward the center of the holding arms 16 and give way elastically toward the fixing part when the supply lines 1 and 2 are being pushed in, after which they spring back to rest radially on the surface of the lines 1 and 2 as shown in FIGS. 3 and 4.

Fixing part 8 is equipped with a locating hole 19, which flares funnel-like, to receive a threaded bolt 9. Suitable means known in the art such as projections 30 in hole 19 are provided that permit the holders to be pressed onto the bolts 9 and that then grip the bolts to anchor them to the vehicle's chassis. On either side of hole 19 and on the lower side of fixing part 8 and diametrically opposed to each other, are the two elastically expandable latching hooks 20. On the upper side of the fixing part 8, are the two latching apertures 21, which are located in the bases of the locking arm 18, that cooperate with latching hooks 20. It will be understood that for the temporary stacking of the cable holders 7 one may use other suitable latching or connecting means—such as push-buttons or the like—which can be released simply by applying an external force. Similarly, during the stacking, smooth rods can be pushed through the locating holes in order to fix the cable holders one on top of the other.

To facilitate the stacking of the cable holders 7, the lower side of the fixing part 8 is recessed in height relative to the holding arms 16 molded on either side thereof so that between the holding arms 16 a niche 22 is formed which is shaped to receive the upper side of the fixing part 8 of the adjacent cable holder. Thus it is only necessary that latching hooks 20 project downwardly from the fixing part 8 the depth "t" of the niche, so that they do not stick out below the surface of the holder. This prevents them from getting in the way when the unit is eventually mounted to the vehicle.

The sequence of removing a unit, which consists of the lines 1, 2 and a plurality of holders 7, from a package containing a plurality of mounting units and mounting it to a vehicle is shown schematically in FIGS. 7 to 11.

First, the entire package is supplied with the pre-mounted supply lines 1 and 2 typically in a magazine 23 having at its lower end latching pawls 24 that can be swung out of the way to release a unit (FIG. 8). The units are pushed in together with the connecting means 20, 21 of the cable holders engaged, so that the last mounting unit, shown in broken line, projects from magazine 23. This mounting unit is then separated form the package by forcibly separating the connecting means of the holders 7 of the last unit in the direction indicated by the arrows 25 and then placed on a mounting plate 10 on which appropriate recesses 11 are provided for receipt of the pre-spaced cable holders 7.

Next, the mounting plate 10, fitted with appropriate components, is placed on a conveyor belt (not shown) and fed to a lifting gear 12 where it is raised in the direction of arrows 26, coming to rest against the underside of the vehicle's chassis 13 until the fixing parts 8 of the cable holders 7 are pushed onto and anchored to the threaded bolts 9. Finally, connecting lines 14 and 15 are inserted in the directions of the arrows 27 and 28 into the coupling pieces 3 at the ends of the supply lines or cables 1 and 2.

With the present invention it is thus possible, as a result of the special design of the cable holders, to assemble and transport a plurality of mounting units as a single package. Another advantage is that, although each of the cable holders alone would slide along the supply lines in the longitudinal direction, as a unit they are immovably positioned on the lines because of the multiplied frictional resistance resulting from their being attached to each other.

What is claimed is:

1. A mounting unit for attaching a cable to a plurality of spaced bolts, said unit comprising in combination at least one cable and a plurality of cable holders mounted on the cable corresponding to the number of bolts, each cable holder having a fixing part on a top side for anchoring the holder to a bolt, an arm for receiving the cable, means for locking the cable in the arm, and cooperating connecting means on said top side and on a bottom side of the cable holder opposite from said top side that can be elastically latched and unlatched so that a plurality of mounting units can be stacked together one on top of the other by latching the connecting means of their holders together while keeping the plurality of holders fixed in position along the length of the cables.

2. The mounting unit of claim 1, wherein the connecting means comprises a pair of elastically expandable latching hooks extending outwardly from one of the said sides of each holder and a pair of cooperating apertures on the other of the said sides of each holder for receiving the hooks of the next adjacent holder.

3. The mounting unit of claim 2, wherein the fixing part is a centrally located hole for receiving and anchoring the holder to the bolt that extends through the holder from the top side to the bottom side and the pairs of hooks and apertures are located on either side of the hole.

4. The mounting unit of claim 3, wherein the apertures are located on the top side of each holder and the cooperating latching hooks extend downwardly from the bottom side of each holder.

5. The mounting unit of claim 4, wherein the holder has a niche in the bottom side for receiving the top side of the next adjacent holder.

6. The mounting unit of claim 5, wherein the latching hooks extend downwardly from inside the niche.

7. The mounting unit of claim 4, for holding a pair of cables, the holder including a pair of arms extending outwardly from opposite sides of the central through hole of the holder and means for locking the cables in the arms.

* * * * *